United States Patent
Pratas et al.

(10) Patent No.: US 12,041,661 B2
(45) Date of Patent: Jul. 16, 2024

(54) RANDOM ACCESS IN WIRELESS COMMUNICATION NETWORKS

(71) Applicant: Nokia Technologies Oy, Espoo (FI)

(72) Inventors: Nuno Manuel Kiilerich Pratas, Gistrup (DK); Claudio Rosa, Randers (DK); Frank Frederiksen, Klarup (DK); Benny Vejlgaard, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 401 days.

(21) Appl. No.: 17/428,310

(22) PCT Filed: Feb. 8, 2019

(86) PCT No.: PCT/EP2019/053145
§ 371 (c)(1),
(2) Date: Aug. 4, 2021

(87) PCT Pub. No.: WO2020/160784
PCT Pub. Date: Aug. 13, 2020

(65) Prior Publication Data
US 2022/0132577 A1    Apr. 28, 2022

(51) Int. Cl.
*H04W 74/0833*    (2024.01)
*H04W 74/00*    (2009.01)

(52) U.S. Cl.
CPC ..... *H04W 74/0833* (2013.01); *H04W 74/002* (2013.01)

(58) Field of Classification Search
CPC ........... H04W 74/0841; H04W 74/006; H04W 74/0866; H04W 72/042; H04W 76/28; H04W 72/0446; H04W 74/0833; H04W 74/002

See application file for complete search history.

(56) References Cited

U.S. PATENT DOCUMENTS

| | | |
|---|---|---|
| 9,253,692 B1 | 2/2016 | Shah et al. |
| 2014/0185495 A1 | 7/2014 | Kuchibhotla et al. |
| 2017/0019930 A1 | 1/2017 | Lee et al. |
| 2018/0070369 A1* | 3/2018 | Papasakellariou .... H04W 56/00 |

(Continued)

FOREIGN PATENT DOCUMENTS

| | | |
|---|---|---|
| CN | 108476513 A | 8/2018 |
| JP | 2015122673 A | 7/2015 |
| WO | WO-2017/074254 A1 | 5/2017 |

OTHER PUBLICATIONS

3GPP TSG RAN WG1 Meeting #94, Gothenburg, Sweden, Aug. 20-24, 2018, R1-1809480, Qualcomm Incorporated, "Initial access and mobility procedures for NR unlicensed", 7 pgs.

(Continued)

*Primary Examiner* — Fred A Casca
(74) *Attorney, Agent, or Firm* — Harrington & Smith

(57) ABSTRACT

According to an example aspect of the present invention, there is provided a method including, receiving, from a wireless terminal, a second connection request message with an uplink reference signal sequence and in response to receiving the second connection request message, transmitting a contention resolution message to the wireless terminal, the contention resolution message including a temporary identifier associated with the wireless terminal and an identifier of the uplink reference signal sequence.

15 Claims, 9 Drawing Sheets

(56) References Cited

U.S. PATENT DOCUMENTS

2018/0146498 A1* 5/2018 Sahlin ............... H04W 56/0005
2020/0245371 A1* 7/2020 Chande ................ H04W 72/04

OTHER PUBLICATIONS

3GPP TSG RAN Wg1 Meeting RAN1#94BIS, Chengdu, P.R. China, Oct. 8-12, 2018, R1-1811885, Charter Communications, "Feature lead summary #1 of initial access and mobility", 10 pgs.
S3GPP TSG RAN WG1 Meeting #95, Spokane, USA, Nov. 12-16, 2018, R1-1812301, vivo, "Discussion on initial access for NR-U", 6 pgs.
3GPP TS 38.321 V15.4.0 (Dec. 2018), "$3^{rd}$ Generation Partnership Project; Technical Specification Group Radio Access Network; NR; Medium Access Control (MAC) protocol specification (Release 15)", Sections 1 and 5, 11 pgs.

* cited by examiner

RANDOM ACCESS IN WIRELESS COMMUNICATION NETWORKS

CROSS REFERENCE TO RELATED APPLICATION

This patent application is a U.S. National Stage application of International Patent Application Number PCT/EP2019/053145 filed Feb. 8, 2019, which is hereby incorporated by reference in its entirety.

FIELD

Various example embodiments relate in general to wireless communication networks, and random access in such networks.

BACKGROUND

Random access may be used to access a wireless communication network, e.g., to request a dedicated connection to be arranged for a wireless terminal requesting the access. Random access procedures may be divided into two types on a general level. In case of contention-free random access, a random access resource may be designated to one wireless terminal. On the other hand, in case of contention-based random access a resource that is used for random access may be shared between several wireless terminals. Therefore, if multiple wireless terminals try to use the same, shared random access resource, collisions may occur and delay the random access process. Collisions may thus cause problems, because typically it is desirable to minimize delays to ensure good performance of wireless communication networks. Consequently there is a need to provide improvements for random access in wireless communication networks.

SUMMARY

According to some aspects, there is provided the subject-matter of the independent claims. Some example embodiments are defined in the dependent claims.

According to a first aspect, there is provided a first method comprising receiving, from a wireless terminal, a second connection request message with an uplink reference signal sequence and in response to receiving the second connection request message, transmitting a contention resolution message to the wireless terminal, the contention resolution message comprising a temporary identifier associated with the terminal and an identifier of the uplink reference signal sequence.

According to the first aspect, the first method may comprise transmitting a random access response message to the wireless terminal, wherein the random access response message comprises the temporary identifier associated with the wireless terminal and a part reserved for identifying the uplink reference signal sequence.

According to the first aspect, all bits of the part of the random access response message reserved for identifying the selected uplink reference signal sequence comprises bits may be zero.

According to the first aspect, the temporary identifier associated with the wireless terminal and the part reserved for identifying the selected uplink reference signal sequence may be received within an information field, wherein a size of the information field may correspond to a maximum size of a temporary identifier associated with the wireless terminal.

According to the first aspect, a size of the temporary identifier may be smaller than a maximum size for the temporary identifier.

According to the first aspect, a size of a part reserved for identifying the uplink reference signal sequence may be a maximum size for the temporary identifier subtracted by a size of the temporary identifier.

According to the first aspect, the selected uplink reference signal sequence may be a demodulation reference signal sequence.

According to a second aspect, there is provided a second method comprising selecting an uplink reference signal sequence for random access, transmitting a second connection request message with the selected uplink reference signal sequence and in response to transmitting the second connection request message, receiving a contention resolution message, the contention resolution message comprising a temporary identifier associated with the wireless terminal and an identifier of the uplink reference signal sequence.

According to the second aspect, the second method may comprise transmitting a random access response message to the wireless terminal, wherein the random access response message comprises the temporary identifier associated with the wireless terminal and a part reserved for identifying the uplink reference signal sequence.

According to the second aspect, all bits of the part of the contention resolution message may be reserved for identifying the selected uplink reference signal sequence are set as zero.

According to the second aspect, the temporary identifier associated with the wireless terminal and the part reserved for identifying the selected uplink reference signal sequence may be transmitted within an information field, wherein a size of the information field corresponds to a maximum size of the temporary identifier.

According to the second aspect, a size of the temporary identifier may be smaller than a maximum size for the temporary identifier.

According to the second aspect, a size of a part reserved for identifying the uplink reference signal sequence may be the maximum size for the temporary identifier subtracted by a size of the temporary identifier.

According to a third aspect of the present invention, there is provided an apparatus comprising at least one processing core, at least one memory including computer program code, the at least one memory and the computer program code being configured to, with the at least one processing core, cause the apparatus at least to perform the first method.

According to a fourth aspect of the present invention, there is provided an apparatus comprising at least one processing core, at least one memory including computer program code, the at least one memory and the computer program code being configured to, with the at least one processing core, cause the apparatus at least to perform the second method.

According to a fifth aspect of the present invention, there is provided an apparatus comprising means for performing the first method. According to a sixth aspect of the present invention, there is provided an apparatus comprising means for performing the second method.

According to a seventh aspect of the present invention, there is provided non-transitory computer readable medium having stored thereon a set of computer readable instructions that, when executed by at least one processor, cause an apparatus to at least perform the first method. According to an eighth aspect of the present invention, there is provided non-transitory computer readable medium having stored thereon a set of computer readable instructions that, when executed by at least one processor, cause an apparatus to at least perform the second method.

According to a ninth aspect of the present invention, there is provided a computer program configured to perform the first method. According to a tenth aspect of the present invention, there is provided a computer program configured to perform the second method.

EXAMPLE EMBODIMENTS

Random access in wireless communication networks may be improved by the procedures described herein. More specifically, a wireless terminal may transmit a second connection request message with an uplink reference signal sequence for random access and the wireless network node may address a response message, such as a contention resolution message, to the wireless terminal by using an identifier of the uplink reference signal sequence.

Figure 1:
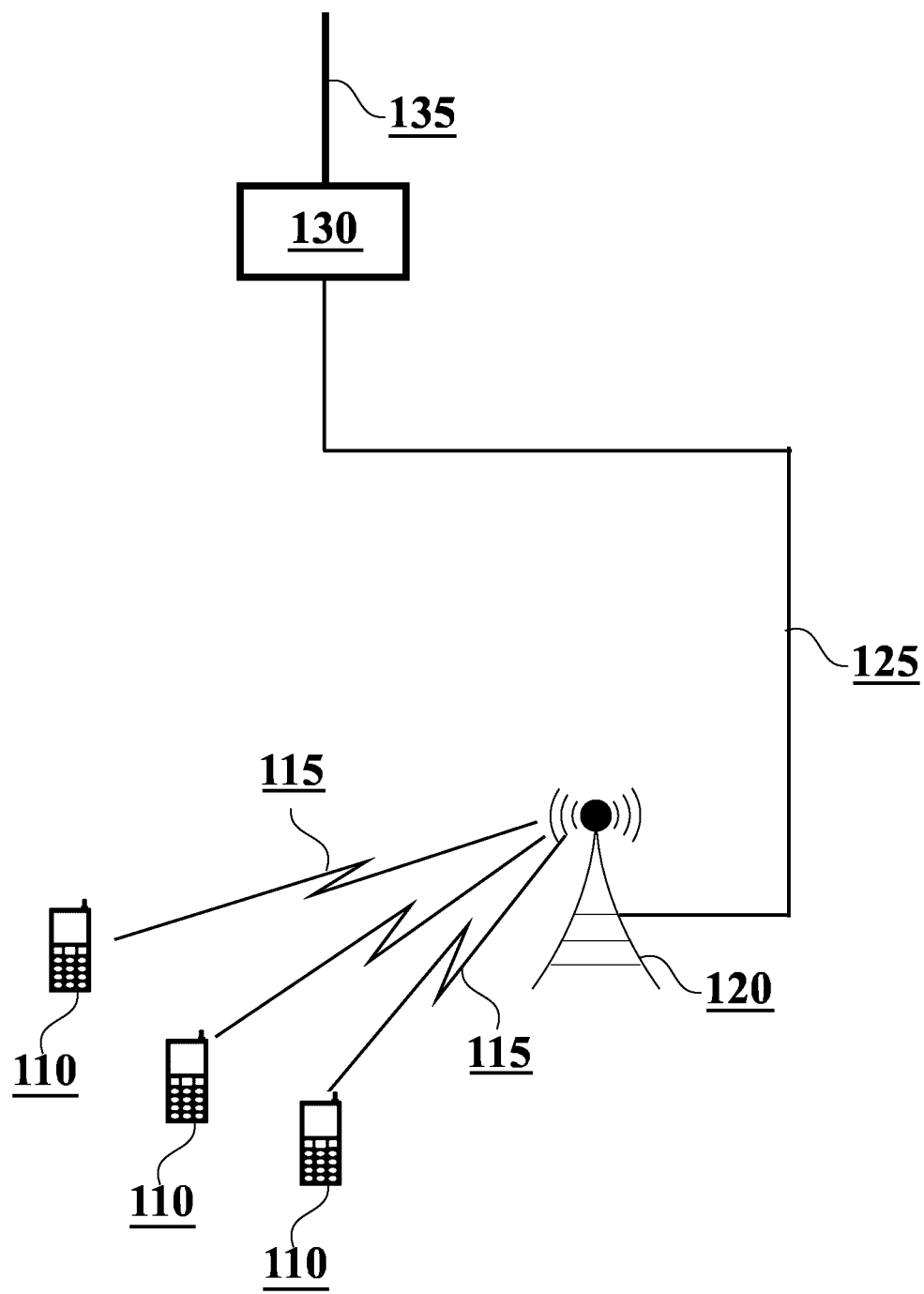
FIG. 1 illustrates an exemplary network scenario in accordance with at least some example embodiments.

FIG. 1 illustrates an exemplary network scenario in accordance with at least some example embodiments. According to the example scenario of FIG. 1, there may be a wireless communication system, which comprises one or more wireless terminals 110, wireless network node 120, and core network element 130. Wireless terminals 110 may be connected to BS 120 via air interface 115.

Wireless terminals 110 may comprise, for example, a User Equipment, UE, a smartphone, a cellular phone, a Machine-to-Machine, M2M, node, Machine-Type Communications node, MTC, an Internet of Things, IoT, node, a car telemetry unit, a laptop computer, a tablet computer or, indeed, another kind of suitable wireless terminal or mobile station. In the example system of FIG. 1, wireless terminals 110 may communicate wirelessly wireless network node 120, or with a cell of wireless network node 120, via air interface 115. In some example embodiments, wireless network node 120 may be considered as a serving Base Station, BS, for wireless terminals 110.

Air interface 115 between wireless terminals 110 and BS 120 may be configured in accordance with a Radio Access Technology, RAT, which wireless terminals 110 and wireless network node 120 are configured to support. Examples of cellular RATs include Long Term Evolution, LTE, New Radio, NR, which may also be known as fifth generation, 5G, radio access technology and MulteFire. On the other hand, examples of non-cellular RATs include Wireless Local Area Network, WLAN, and Worldwide Interoperability for Microwave Access, WiMAX.

For example, in the context of LTE, wireless network node 120 may be referred to as eNB while in the context of NR, wireless network node 120 may be referred to as gNB. Wireless terminals 110 may be similarly referred to as UEs, e.g., in the context of LTE and NR. Also, for example in the context of WLAN, wireless network node 120 may be referred to as an access point. In any case, example embodiments are not restricted to any particular wireless technology. Instead, example embodiments may be exploited in any wireless communication network which uses random access.

Wireless network node 120 may be connected, directly or via at least one intermediate node, with core network 130 via interface 125. Core network 130 may be, in turn, coupled via interface 135 with another network (not shown in FIG. 1), via which connectivity to further networks may be obtained, for example via a worldwide interconnection network. Wireless network node 120 may be connected with at least one other wireless network node as well via an inter-base station interface (not shown in FIG. 1), even though in some example embodiments the inter-base station interface may be absent. Wireless network node 120 may be connected, directly or via at least one intermediate node, with core network 130 or with another core network.

Moreover, example embodiments may be exploited in various wireless communication networks. For instance, example embodiments may be exploited in cellular communication networks operating on unlicensed spectrum. The use of unlicensed spectrum, wherein for example NR-Unlicensed, NR-U, may be targeted to be deployed, may require that a Listen-Before-Talk, LBT, check is performed and passed before any transmission can be done over the air interface. However, the LBT requirement may have a significant impact on the performance of the wireless communication network, because LBT mechanism may induce delays depending on a degree of channel activity. More specifically, if the LBT check fails, the transmission needs to be postponed and another LBT check has to be performed for the transmission later, which causes unpredictable delays.

A wireless terminal may initiate communications towards a wireless network node using Contention-Free Random Access, CFRA, wherein a random access channel, or a resource, is dedicated to the wireless terminal, or Contention-Based Random Access, CBRA, wherein a random access channel, or a resource, may be shared between multiple wireless terminals in the sense that said multiple wireless terminals are authorized to transmit on the random access channel/resource.

In case of CBRA, a collision between two wireless terminals using this random access channel may be made less likely by using random access preambles. Random access preambles may be orthogonal to each other or have very low cross-correlation between each other. Since the random access preambles are orthogonal or have a very low cross-correlation, the wireless network node may be able to detect more than one transmission despite the transmissions taking place at the same time, over the same frequency resources. On the other hand, a collision may occur when at least two wireless terminals transmit on the random access channel at the same time, over the same frequency resources, and using the same random access preamble, such that the wireless network node is not able to distinguish between the transmissions.

Figure 2:
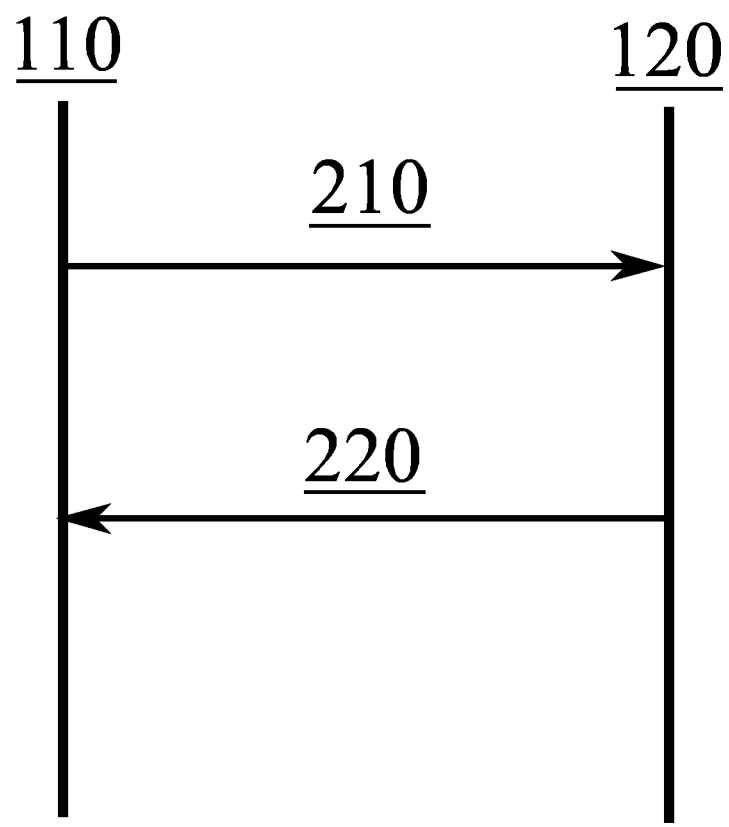
FIG. 2 illustrates an example of a 2-step random access procedure in accordance with at least some example embodiments.

Different procedures may be used for random access, such as a 2-step random access procedure, a 4-step random access procedure or a hybrid 2/4-step random access procedure. FIG. 2 illustrates an example of a 2-step random access procedure in accordance with at least some example embodiments. With reference to FIG. 1, the random access procedure of FIG. 2 may comprise signalling between wireless terminal 110 and wireless network node 120.

The random access procedure may be started, at step 210, by wireless terminal 110, by transmitting a first connection request message to wireless network node 120. The first connection request message may comprise a random access preamble, such as a Physical Random Access Channel, PRACH, preamble. The connection request may also comprise a data transmission, i.e., a data payload. The data transmission may be transmitted over a Physical Uplink Shared Channel, PUSCH. In some example embodiments, the first connection request of the 2-step random access procedure may be referred to as Message A, MsgA, as well.

If wireless network node 120 can decode successfully both, the random access preamble and the data transmission, wireless network node 120 may transmit, at step 220, a contention resolution message to wireless terminal 110, to acknowledge reception of the connection request message and perform contention resolution. In some example embodiments, the contention resolution message may be referred to as Message B, MsgB. The contention resolution message may be referred to as a response message in general. The 2-step random access procedure may stop when wireless terminal 110 has received the contention resolution message.

Figure 3:
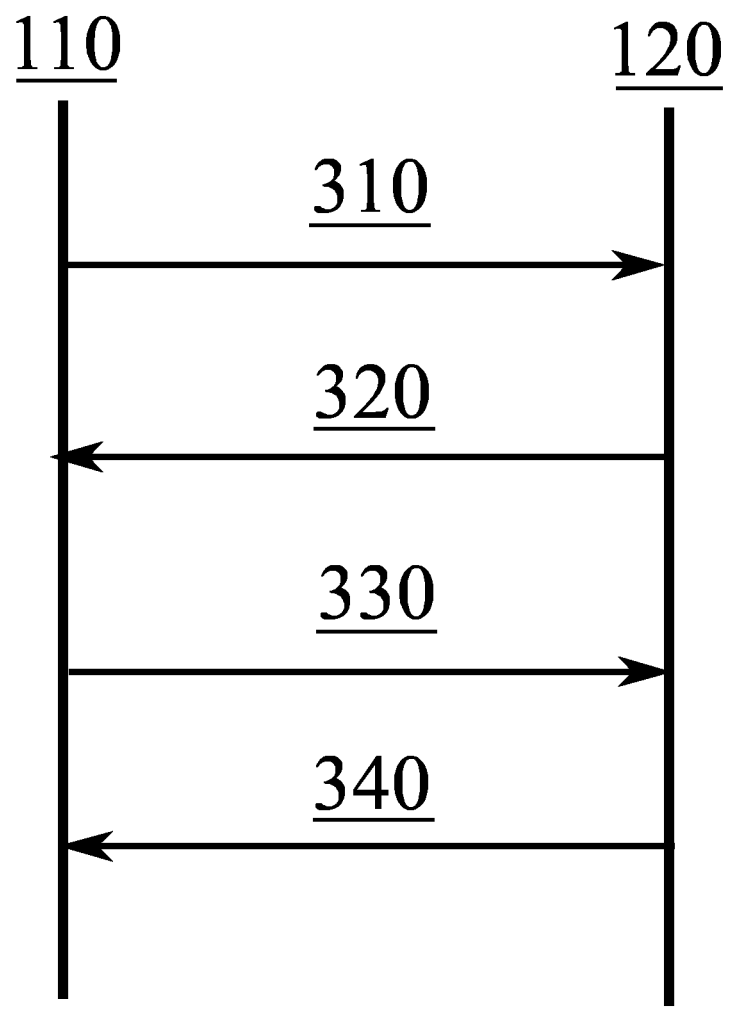
FIG. 3 illustrates an example of a hybrid 2/4-step or a 4-step random access procedure in accordance with at least some example embodiments.

FIG. 3 illustrates an example of a hybrid 2/4-step or a 4-step random access procedure in accordance with at least some example embodiments. With reference to FIG. 1 again, the random access procedure of FIG. 3 may comprise signalling between wireless terminal 110 and wireless network node 120.

In case of the 4-step random access procedure, wireless terminal 110 may transmit, at step 310, the random access preamble (Msg1) and upon receiving the random access preamble, wireless network node 120 may, at step 320, transmit the random access response (Msg2). Moreover, wireless terminal 110 may, at step 330, transmit a first connection request message (Msg3) in response to receiving the random access response. Consequently, wireless network node 120 may, at step 340, transmit a response, such as a contention resolution message (Msg4), in response to receiving the first connection request.

The 4-step CBRA procedure may often be considered as a default procedure, unless specific signalling is sent in the downlink by the wireless network node. However, in such a case the 4-step CBRA procedure and the hybrid 2/4-step CBRA procedure may need to coexist. Coexistence may be enabled by portioning random access preambles, such as PRACH preambles, into multiple groups in addition to partitioning random access preambles into resources for CBRA and CFRA. CBRA resources may be further partitioned in subsets as well, e.g., 46 PRACH preambles for 4-Step CBRA and 8 PRACH preambles for hybrid 2/4-Step CBRA for an example case where 10 PRACH preambles have been reserved for CFRA. Also, one option may be to partition in time (i.e., PRACH opportunities, in frequency (separate set of resources for each procedure)) or in spatial domain (beams) for expanding signalling space for random access preambles. A separation between random access preambles of the 4-step random access procedure and random access preambles of the hybrid 2/4-step random access procedure may be done to allow for a mechanism for the wireless terminal to indicate to the wireless network node whether it supports the 2-step random access procedure.

In case of the hybrid 2/4-step random access procedure, the procedure may be started, at step 310, by wireless terminal 110, by transmitting a first connection request message to wireless network node 120. The first connection request message may comprise a random access preamble, such as a Physical Random Access Channel, PRACH, preamble. The first connection request may also comprise a data transmission, i.e., a data payload. The data transmission may be transmitted over a Physical Uplink Shared Channel, PUSCH. In some example embodiments, the first connection request may be referred to as Message A, MsgA, as well.

If wireless network node 120 can decode successfully both, the random access preamble and the data transmission, wireless network node 110 may transmit, at step 320, a contention resolution message to wireless terminal 110 similarly as in case of the 2-step random access procedure, to acknowledge reception of the connection request message and perform contention resolution. In some example embodiments, the contention resolution message may be referred to as Message B, MsgB, as well.

However, if wireless network node 120 cannot receive the first connection request successfully, wireless network node 120 may decide to fall back to the 4-step random access procedure. In such a case, wireless network node 120 may transmit, at step 320, a random access response to wireless terminal 110, to acknowledge reception of the random access preamble. In some example embodiments, the random access response message may be referred to as Message 2, Msg2, as well. In general, the random access response may be referred to as a response to the first connection request message.

Upon receiving the random access response, wireless terminal 110 may, at step 330, transmit a second connection request to wireless network node 120. The second connection request may be transmitted on an uplink shared channel, such as PUSCH. In some example embodiments, the second connection request message may be referred to as Message 3, Msg3, as well. In the case of the hybrid 2/4-step random access procedure, the second connection request may comprise at least part of the data payload of the first connection request.

If wireless network node 120 can receive the connection request message successfully, wireless network node 120 may transmit, at step 340, a contention resolution message to wireless terminal 110, to acknowledge reception of the connection request message. In some example embodiments, the contention resolution message may be referred to as Message 4, Msg4. The contention resolution message may be referred to as a response as well.

In case of the hybrid 2/4-step random access procedure, a number of uplink shared channel resources may need to be reserved on an uplink shared channel, such as PUSCH resource elements, to enable the transmission of the data part/payload of the first connection request message (MsgA). To avoid two separate LBT checks, the reserved uplink shared channel resources may be scheduled so that those are contiguous in time with random access channel resources, such as PRACH resources, or carried in parallel in frequency at the same time as the random channel transmission. However, example embodiments may also be used in case the transmission of the random access preamble on a random access channel resource and data payload on an uplink shared resource of the first connection request message of the hybrid 2/4-Step CBRA procedure (MsgA) are separated in time.

During operation there may be uncertainty as to whether any transmission on a random access channel resources will happen or not, because such an action may be triggered due to various reasons, like uplink traffic, incoming handover, beam failure recovery, etc. For example, potential triggers for random access procedure can be found from the 3rd Generation Partnership Project, 3GPP, TS 38.300 standard specification. In case of the 4-step random access procedure, the overhead for random access channel may be limited to the resources reserved for the random access preambles. However, in case of the hybrid 2/4-step random access procedure, a much larger set of resources may need to be reserved for the data part/payload of the first connection request message (MsgA).

However, decreasing the contention space (i.e. the number of resources available for contention) would not be desirable because it would degrade performance and lead to an increased number of repetitions.

Figure 4:
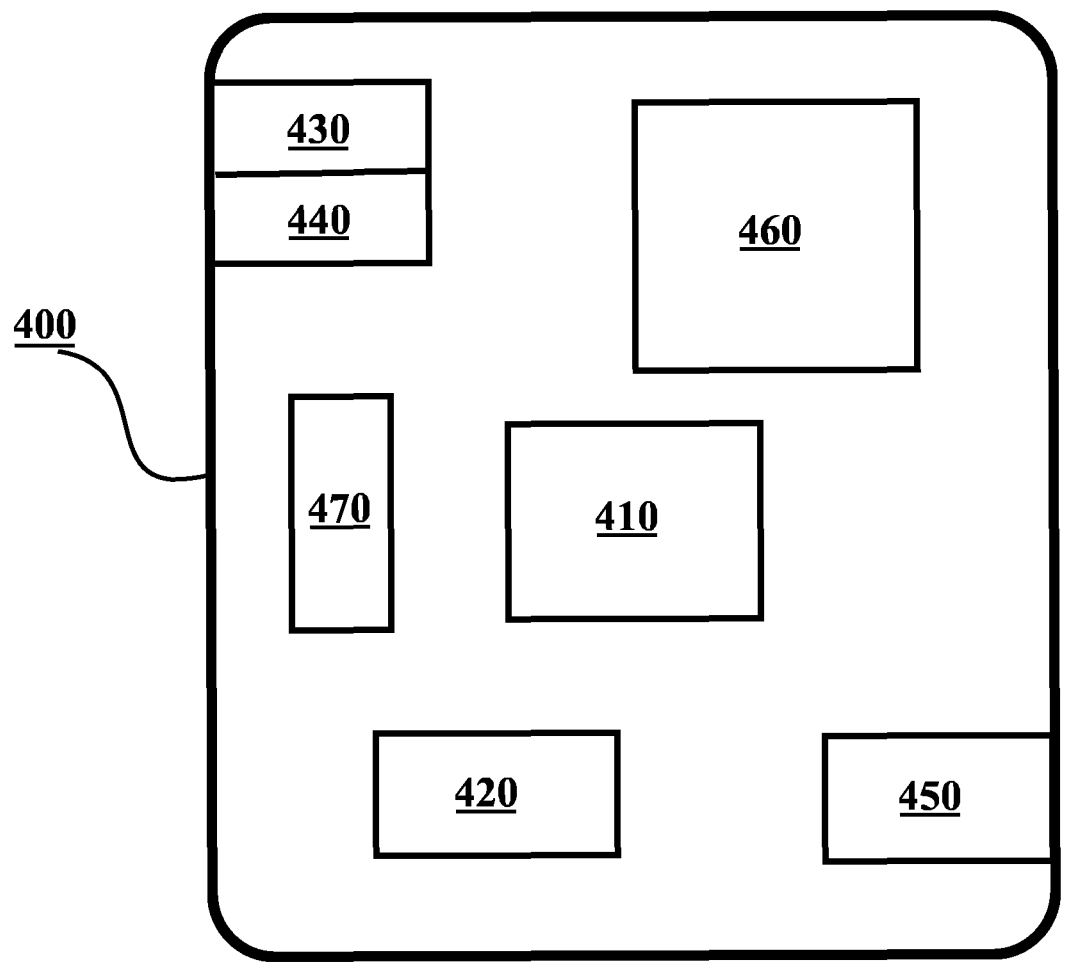
FIG. 4 illustrates an example apparatus capable of supporting at least some example embodiments.

FIG. 4 illustrates an example apparatus capable of supporting at least some example embodiments. Illustrated is device 400, which may comprise, for example, wireless terminal 110 or wireless network node 120, or a device controlling wireless terminal 110 or wireless network node 120. Comprised in device 400 is processor 410, which may comprise, for example, a single- or multi-core processor wherein a single-core processor comprises one processing core and a multi-core processor comprises more than one processing core. Processor 410 may comprise, in general, a control device. Processor 410 may comprise more than one processor. Processor 410 may be a control device. A processing core may comprise, for example, a Cortex-A8 processing core manufactured by ARM Holdings or a Steamroller processing core produced by Advanced Micro Devices Corporation. Processor 410 may comprise at least one Qualcomm Snapdragon and/or Intel Atom processor. Processor 410 may comprise at least one application-specific integrated circuit, ASIC. Processor 410 may comprise at least one field-programmable gate array, FPGA. Processor 410 may be means for performing method steps in device 400. Processor 410 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 400 may comprise memory 420. Memory 420 may comprise random-access memory and/or permanent memory. Memory 420 may comprise at least one RAM chip. Memory 420 may comprise solid-state, magnetic, optical and/or holographic memory, for example. Memory 420 may be at least in part accessible to processor 410. Memory 420 may be at least in part comprised in processor 410. Memory 420 may be means for storing information. Memory 420 may comprise computer instructions that processor 410 is configured to execute. When computer instructions configured to cause processor 410 to perform certain actions are stored in memory 420, and device 400 overall is configured to run under the direction of processor 410 using computer instructions from memory 420, processor 410 and/or its at least one processing core may be considered to be configured to perform said certain actions. Memory 420 may be at least in part comprised in processor 410. Memory 420 may be at least in part external to device 400 but accessible to device 400.

Device 400 may comprise a transmitter 430. Device 400 may comprise a receiver 440. Transmitter 430 and receiver 440 may be configured to transmit and receive, respectively, information in accordance with at least one cellular or non-cellular standard. Transmitter 430 may comprise more than one transmitter. Receiver 440 may comprise more than one receiver. Transmitter 430 and/or receiver 440 may be configured to operate in accordance with Global System for Mobile communication, GSM, Wideband Code Division Multiple Access, WCDMA, 5G/NR, Long Term Evolution, LTE, IS-95, Wireless Local Area Network, WLAN, Ethernet and/or Worldwide Interoperability for Microwave Access, WiMAX, standards, for example.

Device 400 may comprise a Near-Field Communication, NFC, transceiver 450. NFC transceiver 450 may support at least one NFC technology, such as Bluetooth, or similar technologies.

Device 400 may comprise User Interface, UI, 460. UI 460 may comprise at least one of a display, a keyboard, a touchscreen, a vibrator arranged to signal to a user by causing device 400 to vibrate, a speaker and a microphone. A user may be able to operate device 400 via UI 460, for example to accept incoming telephone calls, to originate telephone calls or video calls, to browse the Internet, to manage digital files stored in memory 420 or on a cloud accessible via transmitter 430 and receiver 440, or via NFC transceiver 450, and/or to play games.

Device 400 may comprise or be arranged to accept a user identity module 470. User identity module 470 may comprise, for example, a Subscriber Identity Module, SIM, card installable in device 400. A user identity module 470 may comprise information identifying a subscription of a user of device 400. A user identity module 470 may comprise cryptographic information usable to verify the identity of a user of device 400 and/or to facilitate encryption of communicated information and billing of the user of device 400 for communication effected via device 400.

Processor 410 may be furnished with a transmitter arranged to output information from processor 410, via electrical leads internal to device 400, to other devices comprised in device 400. Such a transmitter may comprise a serial bus transmitter arranged to, for example, output information via at least one electrical lead to memory 420 for storage therein. Alternatively to a serial bus, the transmitter may comprise a parallel bus transmitter. Likewise processor 410 may comprise a receiver arranged to receive information in processor 410, via electrical leads internal to device 400, from other devices comprised in device 400. Such a receiver may comprise a serial bus receiver arranged to, for example, receive information via at least one electrical lead from receiver 440 for processing in processor 410. Alternatively to a serial bus, the receiver may comprise a parallel bus receiver.

Device 400 may comprise further devices not illustrated in FIG. 4. For example, where device 400 comprises a smartphone, it may comprise at least one digital camera. Some devices 400 may comprise a back-facing camera and a front-facing camera, wherein the back-facing camera may be intended for digital photography and the front-facing camera for video telephony. Device 400 may comprise a fingerprint sensor arranged to authenticate, at least in part, a user of device 400. In some example embodiments, device 400 lacks at least one device described above. For example, some devices 400 may lack a NFC transceiver 450 and/or user identity module 470.

Processor 410, memory 420, transmitter 430, receiver 440, NFC transceiver 450, UI 460 and/or user identity module 470 may be interconnected by electrical leads internal to device 400 in a multitude of different ways. For example, each of the aforementioned devices may be separately connected to a master bus internal to device 400, to allow for the devices to exchange information. However, as the skilled person will appreciate, this is only one example and depending on the example embodiment various ways of interconnecting at least two of the aforementioned devices may be selected without departing from the scope of the example embodiments.

In some example embodiments, a wireless network node, such as a BS/gNB, may be able to decode multiple simultaneous transmissions received over an uplink shared channel resource, e.g., a PUSCH resource. For instance, the wireless network node may be able to decode simultaneous transmissions from various wireless terminals, such as UEs, when each wireless terminal is assigned, or each wireless terminal selects, an orthogonal uplink reference signal sequence, e.g., an orthogonal DMRS sequence. In other words, the available uplink reference signal sequences may be exploited to add an extra degree of freedom for random access that can be exploited by the wireless network node for separating wireless terminals transmitting simultaneously over the same uplink shared random access resource.

Multiple orthogonal uplink reference signal sequences may be exploited for transmitting, by wireless terminals, connection request messages, such as Msg3 in case of the 4-step random access procedure or the second connection request message Msg3 in case of the hybrid 2/4-step random access procedure. In other words, each wireless terminal that decides to perform random access may select independently one uplink reference signal for a connection request message, from a set of uplink reference signal sequences, to use when transmitting over a selected uplink shared resource.

Even if the wireless network node would be unable to decode the entire connection request message, the use of the multiple orthogonal uplink reference signal sequences would enable, e.g., assigning dedicated uplink shared channel resources to the wireless terminals for transmitting second connection requests (Msg3).

A mechanism is therefore provided which makes it possible for the wireless network node to expand the signalling space for wireless terminals that are attempting a random access procedure. For example, response messages, such as random access response message and contention resolution messages, may comprise a part that is reserved or used for identifying the selected uplink reference signal sequence for the transmission of a connection request message. A wireless network node may therefore address a wireless terminal that has selected an uplink reference signal sequence, e.g., a DMRS sequence, for example in each assigned shared uplink resource, such as in each PUSCH resource element. Consequently, the wireless terminal may identify that a response message is addressed to the wireless terminal.

Figure 5:
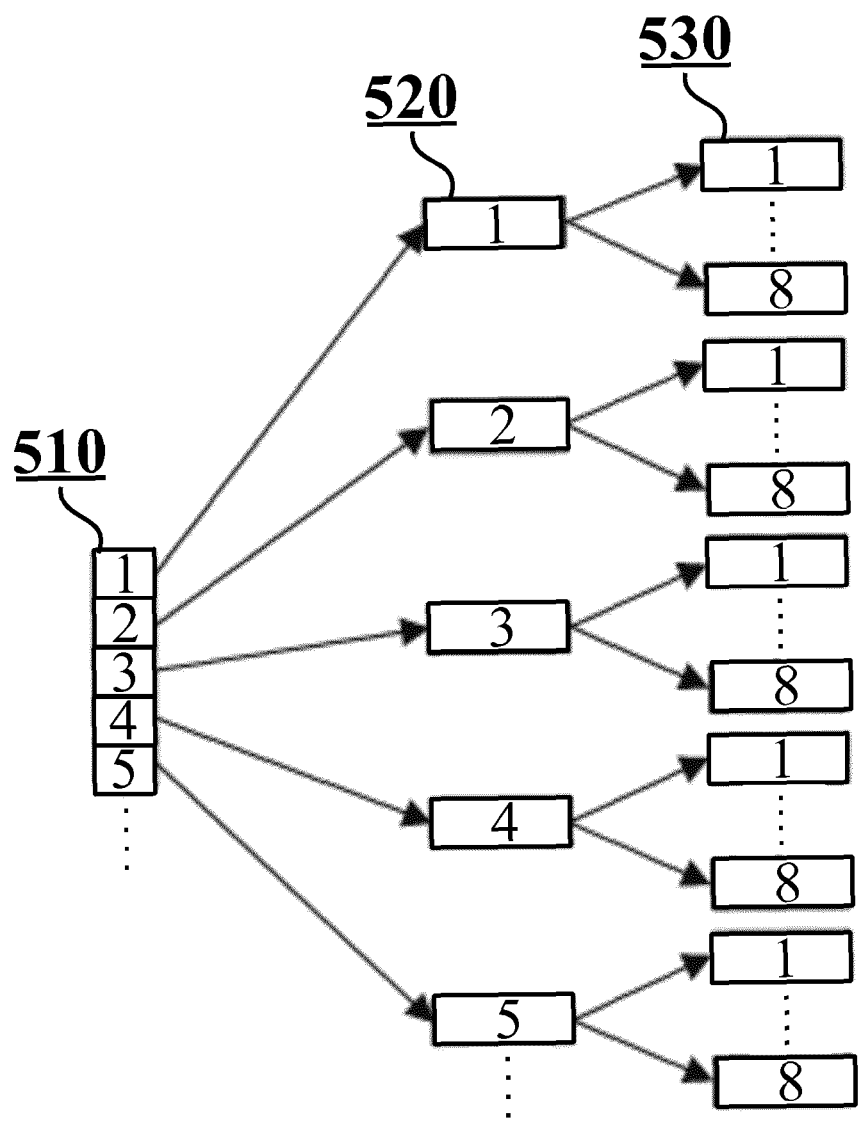
FIG. 5 illustrates an example about the use of multiple uplink reference signal sequences in accordance with at least some example embodiments.

FIG. 5 illustrates an example about the use of multiple uplink reference signal sequences in accordance with at least some example embodiments. In FIG. 5, random access preambles, such as PRACH preambles, are denoted by 510, uplink shared resources, such as PUSCH resource elements, are denoted by 520 and uplink reference signal sequences, such as DMRS sequences, are denoted by 530. Thus, there may be at least five random access preambles 510 for wireless terminals to select together with at least five uplink resources 520 available. In addition, there may be eight uplink reference signal sequences 530 in correspondence of each one uplink shared resource 520. That is to say, one wireless terminal may use a combination of one selected random access preamble 510, one allocated uplink shared resource 520 and one reference signal sequence 530 for transmission of a connection request message, such as Msg1 and Msg3.

Moreover, some example embodiments provide an information field, such as a Medium Access Control, MAC, payload, which may be exploited for connection request messages (Msg3), contention resolution messages (Msg4) and random access response messages (Msg2) of FIGS. 2 and 3. The information field may be used to address wireless terminals that have selected an uplink reference signal sequence in an assigned uplink resource element for transmission of the connection request message.

In some example embodiments, a wireless terminal, such as a UE, and a wireless network node, such as BS/gNB, may perform the following actions. In the following a 4-step random access procedure is used as an example but similar actions are also suitable for a hybrid 2/4—random access procedure.

In the beginning of a process, the wireless network node may broadcast a configuration for the random access procedure, i.e., details about a configuration to be used by the wireless terminal for random access. The configuration may comprise a set of random access preambles that are applicable for the random access procedure. Alternatively, or in addition, the configuration may comprise a set of uplink reference signal sequences, such as available orthogonal DRMS sequences per PUSCH resource, and frequency opportunities for a random access channel, such as for a PRACH. With reference to FIG. 5 again, even though FIG. 5 shows eight available uplink reference signal sequences 530 for illustrative purposes, in practice any non-$2^k$ number of uplink reference signal sequences may be available.

In some example embodiments, a wireless terminal wanting to try the random access procedure, following the 4-step random access procedure, may select a time and frequency opportunity for the random access channel according to the received configuration. Alternatively, or in addition, the wireless terminal may select a random access preamble, possibly from a set of valid preambles, according to the received configuration, i.e., within limits provided via the configuration.

Moreover, the wireless terminal may transmit the selected random access preamble, for example by transmitting Msg1, to the wireless network node. The wireless network node may attempt detection of active random access preambles, i.e., all random access preambles transmitted by at least one wireless terminal. Upon attempting the detection of active random access preambles, i.e., at the end of the detection process, the wireless network node may have a list of random access preambles that the wireless network node detected. That is to say, the wireless network node may have a list of random access preambles that the wireless terminals transmitted. Consequently, the wireless network node may acknowledge the detected random access preambles by transmitting a response message, such as a random access response message, i.e., Msg2. The response message may comprise a temporary identifier associated with the wireless terminal and a part reserved for identifying an uplink reference signal sequence.

In some example embodiments, the wireless network node may transmit the random access response message within a random access response window, possibly with identifiers, on a downlink control channel, such as Primary Downlink Control Channel, PDCCH. For instance, in some example embodiments, the wireless network node may address the wireless terminal through a Random Access Radio Network Temporary Identifier, RA-RNTI, while carrying the response message (Msg2), e.g., on the PDSCH carrying a MAC Packet Data Unit, PDU. The random access response may comprise a timing advance command, an uplink grant for a shared uplink channel resource, such as PUSCH resource, and/or a temporary identifier associated with the wireless terminal, such as a C-RNTI.

In some example embodiments, temporary identifiers associated with wireless terminals, transmitted in the random access response, may be decoded by hence used for all devices that have transmitted the same random access preamble.

Figure 6:
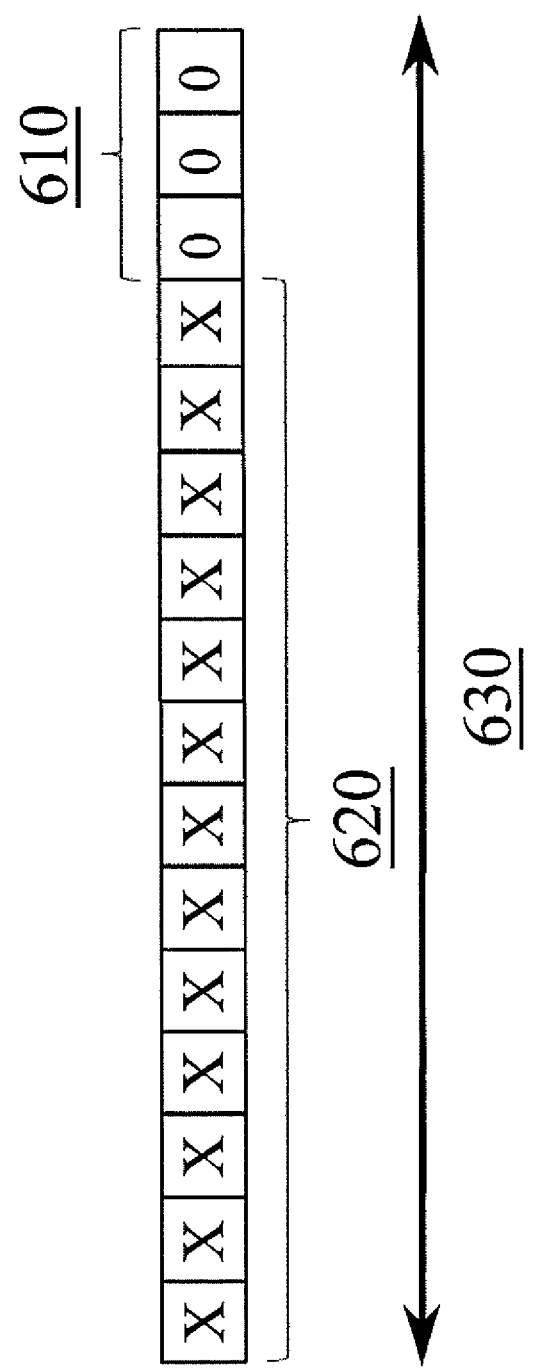
FIG. 6 illustrates an example information field comprising a temporary identifier associated with a wireless terminal and a part reserved for identifying the selected uplink reference signal sequence in accordance with at least some example embodiments.

FIG. 6 illustrates an example information field comprising a temporary identifier associated with a wireless terminal and a part reserved for identifying the selected uplink reference signal sequence in accordance with at least some example embodiments. In FIG. 6, the part reserved for identifying uplink reference signal sequence, such as DMRS, is denoted by 610, a temporary identifier associated with a wireless terminal, such as temporary C-RNTI, is denoted by 620 and a maximum size for the temporary identifier is denoted by 630. The maximum size for the temporary identifier 630 may correspond to the information field. That is to say, a size of the information field may correspond to the maximum size for the temporary identifier 630 and the information field may comprise a part reserved for identifying uplink reference signal sequence 610 and a temporary identifier associated with a wireless terminal 620.

Hence the size of the temporary identifier 620 may be smaller than the maximum size for the temporary identifier 630. Also, a size of the part reserved for identifying the uplink reference signal sequence 610 may be the maximum size for the temporary identifier 630 subtracted by a size of the temporary identifier 620.

Thus, in some example embodiments, some bits of the information field may be reserved for identifying the uplink reference signal sequence 610. For instance, if 8 DMRS sequences are used, 3 bits of the temporary C-RNTI may be used in a contention resolution message, such as Msg4, to indicate the DMRS sequence selected by the wireless terminal and transmitted to the wireless network node in a connection request message, such as Msg3. If the maximum size of for the temporary identifier 630 is 16 bits and 3 bits are reserved for the uplink reference signal sequence 610, then the size of the temporary identifier 620 is 13 bits.

More generally, in some example embodiments, the temporary C-RNTI and the identifier of the selected DMRS sequence may be used in Msg3 when addressing the contention resolution message to the wireless terminal. For instance, reserving n bits of the RNTI field in Msg2/Msg4 may be reserved for addressing the contention resolution message to the wireless terminal.

Furthermore, the wireless terminal may receive the random access response message, i.e., Msg2, and decode random access response message. Upon decoding the received message, the wireless terminal may proceed with the 4-step random access procedure.

The wireless terminal may select, possibly randomly, one uplink reference signal sequence, such as a configured, DMRS sequence, and use the selected uplink reference signal sequence for transmitting a connection request message, such as Msg3, in an uplink shared channel resource element indicated in the received random access response message, such as Msg2. That is to say, the wireless terminal may select randomly one DMRS sequence among a set of available/configured orthogonal DMRS sequences. The uplink shared channel resource element may be a PUSCH resource element.

At each allocated uplink shared channel resource element the wireless network node may attempt detection of each of the available uplink reference signal sequences. Moreover, the wireless network node may proceed and try to decode corresponding data payloads associated with the uplink reference signal sequences.

For every successfully decoded payload, the wireless network node may trigger a transmission of a contention resolution message, such as Msg4. That is to say, the transmission of the contention message may be performed for correctly received connection requests. On the other hand, the wireless network node may not be able to decode some transmissions, e.g., due to interference or unfavourable channel conditions. For those transmission the wireless terminal may trigger Hybrid Automatic Repeat Request, HARQ, retransmission of the corresponding connection request, such as Msg3, for example by using the temporary identifier associated with the wireless terminal, such as a composite C-RNTI, to identify the wireless terminal in question. The composite temporary C-RNTI may be composed by the temporary C-RNTI signaled in the random access response message, such as Msg2, and the identity of the uplink reference signal sequence, such as DMRS sequence, selected for transmission of the connection request message (Msg3). Therefore, even in case of an unresolvable collision after a first transmission of a connection request, the collision may be resolved afterwards, for example by scheduling a non-colliding uplink resource for the retransmission of the connection request.

With reference to FIG. 6 again, the contention resolution message, e.g., payload of Msg4, may comprise the information field 630 and the information field 630 may comprise the temporary identifier associated with the wireless terminal 620, such as C-RNTI, and the part reserved for identifying the uplink reference signal sequence 610, wherein the part comprises an identifier of the selected uplink reference signal sequence, such as the DMRS Sequence Identity, DSEQID, of the DMRS sequence selected by the wireless terminal.

Figure 7:
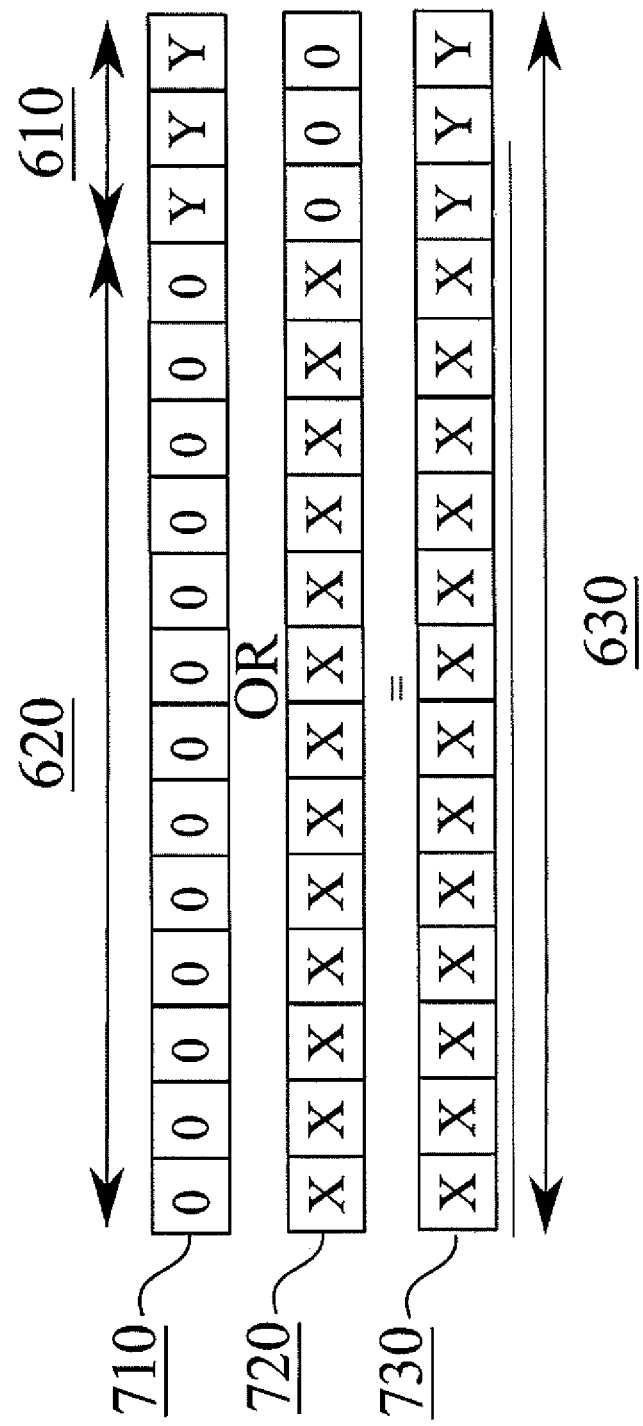
FIG. 7 illustrates an example about generation of a composite temporary C-RNTI in accordance with at least some example embodiments.

FIG. 7 illustrates an example about generation of a composite temporary C-RNTI in accordance with at least some example embodiments. With reference to FIG. 6, a part reserved for identifying uplink reference signal sequence, such as DMRS, is denoted by 610, a temporary identifier associated with a wireless terminal, such as temporary C-RNTI, is denoted by 620, and a maximum size for the temporary identifier, i.e., the information field is denoted by 630. In addition, FIG. 7 demonstrates that the information field 730 may be formed by combining (e.g. applying an OR mask) part reserved for identifying uplink reference signal sequence 710, "Y bits" in FIG. 7, and temporary identifier associated with a wireless terminal 720, "X bits" in FIG. 7.

In some example embodiments, a wireless terminal may fail the 4-step random access procedure. For example, the wireless terminal may fail the procedure because a maximum number of HARQ retransmissions is exceeded or a collision has happened, wherein the collision may be detected from the connection request message, such as Msg4. In such a case, the wireless terminal may back off and reattempt a new random access procedure later. Example embodiments may be thus used to enhance the contention resolution space of random access procedures, such as 4-step random access procedures, by allowing collision resolution and identification of wireless terminals in case multiple wireless terminals select the same random access preamble. Moreover, example embodiments may be exploited for the hybrid 2/4-step random access procedure as well. For instance, example embodiments may be applied to transmission of Msg2, Msg3 and Msg4 in a hybrid 2/4-step procedure in case MsgA is not correctly received by the UE.

Example embodiments may be applied in various wireless communication network. For example, in the context of NR, example embodiments may be applied for NR-U but also beyond NR-U, and be made to coexist with legacy NR UEs. In some example embodiments, legacy NR UEs may interpret the temporary identifier associated with a wireless terminal, i.e., temporary C-RNTI, as a legacy temporary C-RNTI and then transmit their connection request message, such as Msg3, using the default legacy uplink reference signal sequence, i.e., DMRS sequence. To cope with this, there may be a default DMRS sequence reserved for legacy operation, with direct mapping to the temporary C-RNTI, e.g. the DSEQID would be '000', and then an orthogonal set of DMRS sequences reserved for capable UEs, wherein there may be a mapping between the selected DMRS sequence and the DSEQID. The contention resolution message, such as Msg4, for the legacy NR UEs may follow the legacy format, while the one for the new NR UEs may follow a process in accordance with at least some example embodiments of the present invention.

In some example embodiments, a process of obtaining an indicative temporary C-RNTI, assigning a DMRS, and building a final temporary C-RNTI may be formulated as follows, and possibly added to the 3GPP standard specification TS 38.321:

4> else:
  5> set the TEMPORARY C-RNTI to the value received in the Random Access Response;
  5> if this is the first successfully received Random Access Response within this Random Access procedure:
    6> if the transmission is not being made for the CCCH logical channel:
      7> indicate to the Multiplexing and assembly entity to include a C-RNTI MAC CE in the subsequent uplink transmission.
    6> obtain the MAC PDU to transmit from the Multiplexing and assembly entity and store it in the Msg3 buffer.

Figure 8:
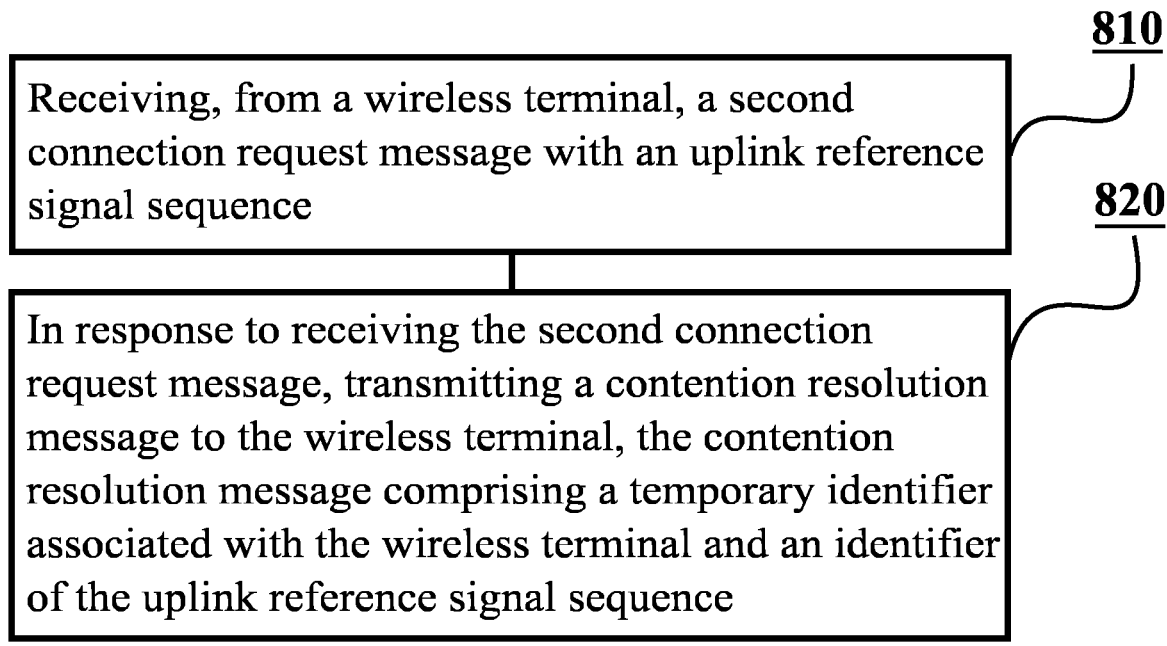
FIG. 8 illustrates a flow graph of a first method in accordance with at least some example embodiments.

FIG. 8 is a flow graph of a first method in accordance with at least some embodiments. The phases of the illustrated first method may be performed by wireless network node 120, or by a control device configured to control the functioning thereof, possibly when installed therein.

The first method may comprise, at step 810, receiving, from a wireless terminal, a second connection request message using an uplink reference signal sequence. The first method may also comprise, at step 820, in response to receiving the second connection request message, transmitting a contention resolution message to the wireless terminal, the contention resolution message comprising a temporary identifier associated with the wireless terminal and an identifier of the uplink reference signal sequence.

Figure 9:
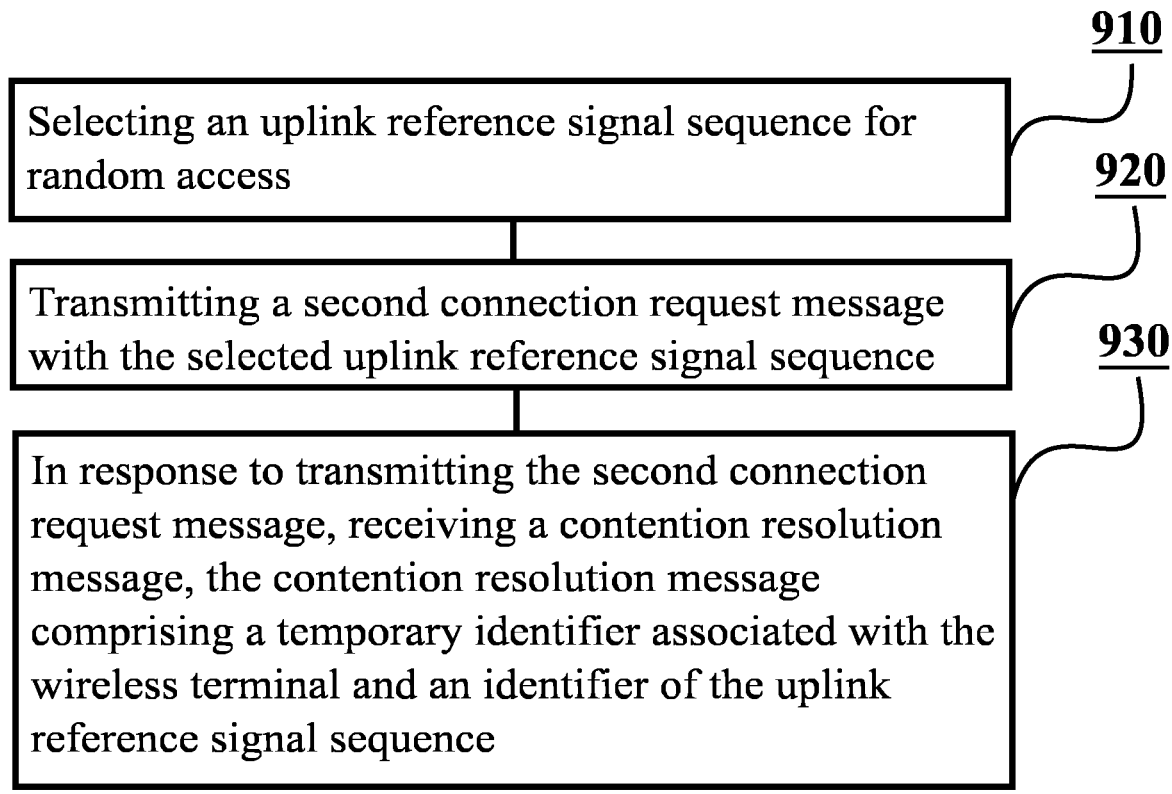
FIG. 9 illustrates a flow graph of a second method in accordance with at least some example embodiments.

FIG. 9 is a flow graph of a second method in accordance with at least some embodiments. The phases of the illustrated second method may be performed by wireless terminal 110, or by a control device configured to control the functioning thereof, possibly when installed therein.

The second method may comprise, at step 910, selecting an uplink reference signal sequence for random access. The second method may also comprise, at step 920, transmitting a second connection request message with the selected uplink reference signal sequence. Finally, the second method may comprise, at step 930, in response to transmitting the second connection request message, a contention resolution message, the contention resolution message comprising a temporary identifier associated with the wireless terminal and an identifier of the uplink reference signal sequence.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an exemplary embodiment, an apparatus, such as, for example, a wireless terminal 110 or a wireless network node 120, or a control device configured to control the functioning thereof, possibly when installed therein, may comprise means for carrying out the embodiments described above and any combination thereof.

In an exemplary example embodiment, a computer program may be configured to cause a method in accordance with the example embodiments described above and any combination thereof. In an exemplary example embodiment, a computer program product, embodied on a non-transitory computer readable medium, may be configured to control a processor to perform a process comprising the example embodiments described above and any combination thereof.

In an exemplary embodiment, an apparatus, such as, for example, a wireless terminal 110 or a wireless network node 120, or a control device configured to control the functioning thereof, possibly when installed therein, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the example embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in wireless communication networks, wherein random access is used. More specifically, at least some embodiments find industrial application in cellular communication networks, such as in 5G/NR networks.

Acronyms List

3GPP 3rd Generation Partnership Project
BS Base Station
C-RNTI Cell-Radio Network Temporary Identifier
CBRA Contention-Based Random Access
CFRA Contention-Free Random Access
DCI Downlink Control Information
DMRS Demodulation Reference Signal
GSM Global System for Mobile communication
IoT Internet of Things
LBT Listen-Before-Talk
LTE Long-Term Evolution
M2M Machine-to-Machine
MAC Medium Access Control
MTC Machine-Type Communications
NFC Near-Field Communication
NR New Radio
NR-U NR-Unlicensed
OCC Orthogonal Cover Code
P-RNTI Paging-Radio Network Temporary Identifier
PDU Packet Data Unit
PRACH Physical Random Access Channel
PUSCH Physical Uplink Shared Channel
RA-RNTI Random Access Radio Network Temporary Identifier
RAPID Random Access Preamble Identity
RAT Radio Access Technology
RRC Radio Resource Control
RRM Radio Resource Management
SIM Subscriber Identity Module
UE User Equipment
UI User Interface
UL Uplink
WCDMA Wideband Code Division Multiple Access
WiMAX Worldwide Interoperability for Microwave Access
WLAN Wireless Local Area Network

| REFERENCE SIGNS LIST | |
|---|---|
| 110 | Wireless terminal, e.g., UE |
| 120 | Wireless network node, e.g., BS |
| 130 | Core network |
| 115, 125, 135 | Interfaces |
| 210-220 | Signalling steps in FIG. 2 |
| 310-340 | Signalling steps in FIG. 3 |
| 400-470 | Structure of the apparatus of FIG. 4 |
| 510 | Random access preambles |
| 520 | Uplink shared resources |
| 530 | Uplink reference signal sequences |
| 610, 710 | Part reserved for identifying uplink reference signal |
| 620, 720 | Temporary identifier associated with a wireless terminal |
| 630, 730 | Maximum size for the temporary identifier |
| 810-820 | Phases of the first method in FIG. 8 |
| 910-930 | Phases of the second method in FIG. 9 |

The invention claimed is:

1. A method for a wireless network node, comprising:
receiving, from a wireless terminal, a second connection request message in a random access procedure, the second connection request message including an uplink reference signal sequence;
in response to receiving the second connection request message, transmitting a contention resolution message to the wireless terminal, the contention resolution message comprising a temporary identifier associated with the wireless terminal and an identifier of the uplink reference signal sequence; and transmitting a random access response message to the wireless terminal, wherein the random access response message comprises the temporary identifier associated with the wireless terminal and a part reserved for identifying the uplink reference signal sequence.

2. A method according claim 1, wherein all bits of the part of the random access response message reserved for identifying the uplink reference signal sequence are set as zero.

3. A method according to claim 1, wherein the temporary identifier associated with the wireless terminal and the part reserved for identifying the uplink reference signal sequence are transmitted within an information field, wherein a size of the information field corresponds to a maximum size of the temporary identifier associated with the wireless terminal.

4. A method according to claim 1, wherein a size of the temporary identifier is smaller than a maximum size for the temporary identifier.

5. A method according to claim 1, wherein a size of the part reserved for identifying the uplink reference signal sequence is a maximum size for the temporary identifier subtracted by a size of the temporary identifier.

6. A method according to claim 1, wherein the uplink reference signal sequence is a demodulation reference signal sequence.

7. A method for a wireless terminal, comprising:

selecting an uplink reference signal sequence for random access;

transmitting a second connection request message in a random access procedure, the second connection request message including the selected uplink reference signal sequence;

in response to transmitting the second connection request message, receiving a contention resolution message, the contention resolution message comprising a temporary identifier associated with the wireless terminal and an identifier of the uplink reference signal sequence; and receiving a random access response message, wherein the random access response message comprises the temporary identifier associated with the wireless terminal and a part reserved for identifying the uplink reference signal sequence.

8. A method according to claim 7, wherein all bits of the part of the random access response message reserved for identifying the selected uplink reference signal sequence are set as zero.

9. A method according to claim 7, wherein the temporary identifier associated with the wireless terminal and the part reserved for identifying the selected uplink reference signal sequence are received within an information field, wherein a size of the information field corresponds to a maximum size of the temporary identifier.

10. A method according to claim 7, wherein a size of the temporary identifier is smaller than a maximum size for the temporary identifier.

11. A method according to claim 7, wherein a size of the part reserved for identifying the uplink reference signal sequence is a maximum size for the temporary identifier subtracted by a size of the temporary identifier.

12. An apparatus comprising:
at least one processing core, and
at least one non-transitory memory including computer program code, the at least one memory and the computer program code being configured to, with the at least one processing core, cause the apparatus at least to perform:

receive, from a wireless terminal, a second connection request message in a random access procedure, the second connection request message including an uplink reference signal sequence;

transmit, in response to receiving the second connection request message, a contention resolution message to the wireless terminal, the contention resolution message comprising a temporary identifier associated with the wireless terminal and an identifier of the uplink reference signal sequence; and transmit a random access response message to the wireless terminal, wherein the random access response message comprises the temporary identifier associated with the wireless terminal and a part reserved for identifying the uplink reference signal sequence.

13. An apparatus comprising:
at least one processing core, and
at least one memory including computer program code, the at least one memory and the computer program code being configured to, with the at least one processing core, cause the apparatus at least to perform:

select an uplink reference signal sequence for random access;

transmit a second connection request message in a random access procedure, the second connection request message including the selected uplink reference signal sequence;

receive, in response to transmitting the second connection request message, a contention resolution message, the contention resolution message comprising a temporary identifier associated with a wireless terminal and an identifier of the uplink reference signal sequence; and receive a random access response message, wherein the random access response message comprises the temporary identifier associated with the wireless terminal and a part reserved for identifying the uplink reference signal sequence.

14. A non-transitory computer readable medium having stored thereon a set of computer readable instructions that, when executed by at least one processor, cause an apparatus to at least perform a method according to claim 1.

15. A non-transitory computer readable medium having stored thereon a set of computer readable instructions that, when executed by at least one processor, cause an apparatus to at least perform a method according to claim 7.

* * * * *